United States Patent
Matsuhara et al.

(10) Patent No.: US 11,527,746 B2
(45) Date of Patent: Dec. 13, 2022

(54) LITHIUM ION SECONDARY BATTERY AND METHOD OF PRODUCING THE SAME

(71) Applicant: TOYOTA JIDOSHA KABUSHIKI KAISHA, Toyota (JP)

(72) Inventors: Shinsuke Matsuhara, Miyoshi (JP); Kazuhisa Takeda, Toyota (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 0 days.

(21) Appl. No.: 17/239,982

(22) Filed: Apr. 26, 2021

(65) Prior Publication Data

US 2021/0399279 A1    Dec. 23, 2021

Related U.S. Application Data

(62) Division of application No. 15/813,874, filed on Nov. 15, 2017, now Pat. No. 11,228,024.

(30) Foreign Application Priority Data

Nov. 25, 2016 (JP) .............................. JP2016-228914

(51) Int. Cl.
  *H01M 4/1393*  (2010.01)
  *H01M 4/587*  (2010.01)
  (Continued)

(52) U.S. Cl.
  CPC ......... *H01M 4/1393* (2013.01); *H01M 4/131* (2013.01); *H01M 4/133* (2013.01);
  (Continued)

(58) Field of Classification Search
  CPC ...... H01M 4/131; H01M 4/1393; H01M 4/62; H01M 4/364
  See application file for complete search history.

(56) References Cited

U.S. PATENT DOCUMENTS

| 2012/0164530 A1 | 6/2012 | Temmyo et al. |
| 2016/0268589 A1 | 9/2016 | Do |
| 2018/0151869 A1 | 5/2018 | Matsuhara et al. |

FOREIGN PATENT DOCUMENTS

| CN | 102484244 A | 5/2012 |
| JP | 2000-285966 A | 10/2000 |

(Continued)

OTHER PUBLICATIONS

Notice of Allowance dated Sep. 7, 2021, from the United States Patent and Trademark Office in U.S. Appl. No. 15/813,874.

(Continued)

*Primary Examiner* — Stephan J Essex
(74) *Attorney, Agent, or Firm* — Sughrue Mion, PLLC

(57) ABSTRACT

A lithium ion secondary battery includes at least a positive electrode, a negative electrode, and an electrolyte solution. The negative electrode includes a negative electrode current collector and a negative electrode mixture layer. The negative electrode mixture layer is formed on a surface of the negative electrode current collector. The negative electrode mixture layer includes graphite particles, inorganic filler particles, lithium titanate particles, and a water-based binder. The inorganic filler particles have an average primary particle size that is ½ or less of an average primary particle size of the graphite particles. The lithium titanate particles have an average primary particle size of 1 μm or less. A ratio of an average primary particle size of the lithium titanate particles with respect to an average primary particle size of the inorganic filler particles is one or less.

6 Claims, 8 Drawing Sheets

(51) Int. Cl.
 H01M 4/131 (2010.01)
 H01M 4/62 (2006.01)
 H01M 10/0525 (2010.01)
 H01M 4/133 (2010.01)
 H01M 4/134 (2010.01)
 H01M 4/36 (2006.01)
 H01M 4/485 (2010.01)
 H01M 4/583 (2010.01)
 H01M 4/02 (2006.01)
 C01B 32/20 (2017.01)

(52) U.S. Cl.
 CPC ........... *H01M 4/134* (2013.01); *H01M 4/364* (2013.01); *H01M 4/485* (2013.01); *H01M 4/587* (2013.01); *H01M 4/5835* (2013.01); *H01M 4/62* (2013.01); *H01M 10/0525* (2013.01); *C01B 32/20* (2017.08); *C01B 2204/32* (2013.01); *H01M 4/621* (2013.01); *H01M 2004/021* (2013.01); *Y02T 10/70* (2013.01)

(56) References Cited

FOREIGN PATENT DOCUMENTS

| JP | 2017-174664 A | 9/2017 |
|---|---|---|
| WO | 2012/001840 A1 | 1/2012 |

OTHER PUBLICATIONS

Advisory Action dated Aug. 4, 2021 from the United States Patent and Trademark office in U.S. Appl. No. 15/813,874.

Office Action dated Apr. 29, 2021, issued by the USPTO during the prosecution of U.S. Appl. No. 15/813,874.

LITHIUM ION SECONDARY BATTERY AND METHOD OF PRODUCING THE SAME

INCORPORATION BY REFERENCE

This is a divisional of application Ser. No. 15/813,874 filed Nov. 15, 2017, which claims priority based on Japanese Patent Application No. 2016-228914 filed on Nov. 25, 2016, the entire contents thereof are incorporated herein by reference.

BACKGROUND

1. Technical Field

The present disclosure relates to a lithium ion secondary battery and a method of producing the same.

2. Description of Related Art

Japanese Unexamined Patent Application Publication No. 2000-285966 (JP 2000-285966 A) discloses that a compressive elasticity modulus of a negative electrode is set to be higher than a compressive elasticity modulus of a positive electrode or a separator.

SUMMARY

In general, a negative electrode of a lithium ion secondary battery (hereinafter abbreviated as a "battery" in some cases) includes a negative electrode current collector and a negative electrode mixture layer formed on a surface of the negative electrode current collector. Typically, the negative electrode mixture layer is a particle layer containing graphite particles (negative electrode active material) as a main component. Since gaps between the graphite particles are not completely filled, the negative electrode mixture layer is porous. An electrolyte solution permeates into voids in the negative electrode mixture layer. The electrolyte solution contains lithium (Li) ions as carriers of a current.

Graphite particles tend to be softer than constituent materials of a positive electrode and a separator. When the battery is charged and discharged, the positive electrode and the negative electrode expand and contract. In this case, when the negative electrode is soft, the negative electrode is crushed due to the positive electrode or the like. When the negative electrode is crushed, the electrolyte solution having permeated into the negative electrode mixture layer is extruded. It is thought that this will increase a resistance accordingly. This trend is particularly noticeable when charging and discharging are repeated at a high rate. That is, there is room for improvement in high rate tolerance in batteries in which a negative electrode mixture layer contains graphite particles.

In JP 2000-285966 A, when the negative electrode mixture layer is compressed at a high pressure, hardness is imparted to the negative electrode. However, in the method in JP 2000-285966 A, voids in the negative electrode mixture layer are thought to be crushed due to compression. Accordingly, it is thought that it is difficult for the electrolyte solution to permeate the negative electrode mixture layer. Therefore, in this case also, it is thought that a desired high rate tolerance is not obtained.

The present disclosure provides a lithium ion secondary battery including a negative electrode which has a permeation path of an electrolyte solution and has improved hardness.

Technical configurations and operations and effects of the present disclosure will be described below. However, an operation mechanism of the present disclosure includes assumptions. The scope of the present disclosure should not be limited according to the correctness of this operation mechanism.

[1] A lithium ion secondary battery of the present disclosure includes a positive electrode, a negative electrode, and an electrolyte solution. The negative electrode includes a negative electrode current collector and a negative electrode mixture layer. The negative electrode mixture layer is formed on a surface of the negative electrode current collector. The negative electrode mixture layer includes graphite particles, inorganic filler particles, lithium titanate particles, and a water-based binder. The inorganic filler particles have an average primary particle size that is ½ or less of an average primary particle size of the graphite particles. The lithium titanate particles have an average primary particle size of 1 μm or less. A ratio of an average primary particle size of the lithium titanate particles with respect to an average primary particle size of the inorganic filler particles is one or less.

The "average primary particle size" in this specification refers to a particle size of cumulative 50% from the side of fine particles in a volume-based particle size distribution measured in a powder specimen dispersed to become primary particles. The volume-based particle size distribution is measured by a laser diffraction scattering method or a dynamic light scattering method.

In the present disclosure, the hardness of the negative electrode mixture layer is improved by filler reinforcement. That is, the negative electrode mixture layer includes inorganic filler particles and lithium titanate particles (hereinafter abbreviated as "LTO particles"). The inorganic filler particles and the LTO particles have an average primary particle size that is less than an average primary particle size of the graphite particles. Thus, the inorganic filler particles and the LTO particles fill gaps between the graphite particles.

In the present disclosure, a negative electrode paste including an aqueous solvent is applied to a surface of the negative electrode current collector and dried to form a negative electrode mixture layer. Therefore, the negative electrode mixture layer of the present disclosure includes a water-based binder.

The LTO particles are very hydrophilic. For example, the LTO particles are more hydrophilic than boehmite (AlOOH) particles known as hydrophilic filler particles. Thus, when the negative electrode paste is dried, that is, when the amount of aqueous solvent decreases, the LTO particles are thought to remain in the aqueous solvent preferentially to the inorganic filler particles. Further, in the lithium ion secondary battery of the present disclosure, the average primary particle size of the LTO particles is equal to or less than the average primary particle size of the inorganic filler particles. Thus, the LTO particles enter small gaps that are not filled with the inorganic filler particles.

In this manner, when the inorganic filler particles and the LTO particles fill voids in the negative electrode mixture layer, the hardness of the negative electrode mixture layer (that is, the hardness of the negative electrode) is thought to be significantly improved. The voids which the inorganic filler particles and the LTO particles fill may serve as a permeation path of the electrolyte solution. This is because gaps between particles are not completely filled.

As described above, it is thought that in the lithium ion secondary battery of the present disclosure, the negative electrode may have a permeation path of the electrolyte solution and the hardness of the negative electrode is improved. Therefore, the lithium ion secondary battery of the present disclosure is expected to exhibit excellent high rate tolerance.

However, it is necessary for the inorganic filler particles to have an average primary particle size that is ½ or less of an average primary particle size of the graphite particles and it is necessary for the LTO particles to have an average primary particle size of 1 µm or less.

When the average primary particle size of the inorganic filler particles exceeds ½ of the average primary particle size of the graphite particles, since the number of inorganic filler particles that cannot enter gaps between the graphite particles increases, there is a possibility of sufficient hardness not being obtained. When the average primary particle size of the LTO particles exceeds 1 µm, since the number of LTO particles that cannot enter small gaps increases, there is a possibility of sufficient hardness not being obtained.

[2] The ratio of the average primary particle size of the lithium titanate particles with respect to the average primary particle size of the inorganic filler particles may be 0.20 or more. Thereby, the hardness of the negative electrode mixture layer is expected to be further improved and the high rate tolerance is expected to be improved.

[3] The ratio of the average primary particle size of the lithium titanate particles with respect to the average primary particle size of the inorganic filler particles may be 0.23 or more. Thereby, the hardness of the negative electrode mixture layer is expected to be further improved and the high rate tolerance is expected to be improved.

[4] The inorganic filler particles may have, for example, an average primary particle size that is 1/10 or more of the average primary particle size of the graphite particles.

[5] The lithium titanate particles may have, for example, an average primary particle size of 0.7 µm or more.

[6] The inorganic filler particles may be, for example, at least one selected from the group consisting of boehmite particles, alumina particles, and aluminum hydroxide particles. Since boehmite (AlOOH) particles, alumina ($Al_2O_3$) particles, and aluminum hydroxide ($Al(OH)_3$) particles exhibit appropriate hydrophilicity, they are suitable for the inorganic filler particles of the present disclosure.

[7] A method of producing a lithium ion secondary battery of the present disclosure includes the following (A) to (D): (A) mixing graphite particles, inorganic filler particles, lithium titanate particles, a water-based binder, and an aqueous solvent to prepare a negative electrode paste, (B) applying the negative electrode paste to a surface of a negative electrode current collector and performing drying to form a negative electrode mixture layer, (C) producing a negative electrode including the negative electrode current collector and the negative electrode mixture layer, and (D) producing a lithium ion secondary battery including a positive electrode, the negative electrode, and the electrolyte solution. The inorganic filler particles have an average primary particle size that is ½ or less of an average primary particle size of the graphite particles. The lithium titanate particles have an average primary particle size of 1 µm or less. A ratio of an average primary particle size of the lithium titanate particles with respect to an average primary particle size of the inorganic filler particles is one or less.

As described above, when the negative electrode paste including an aqueous solvent is applied to a surface of the negative electrode current collector and dried, the inorganic filler particles and the LTO particles efficiently fill voids between the graphite particles. Accordingly, a negative electrode having a permeation path of the electrolyte solution and improved hardness can be produced.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Embodiments (hereinafter referred to as the "present embodiment") of the present disclosure will be described below. However, the scope of the present disclosure should not be limited to the following description.

<Lithium Ion Secondary Battery>

Figure 1:
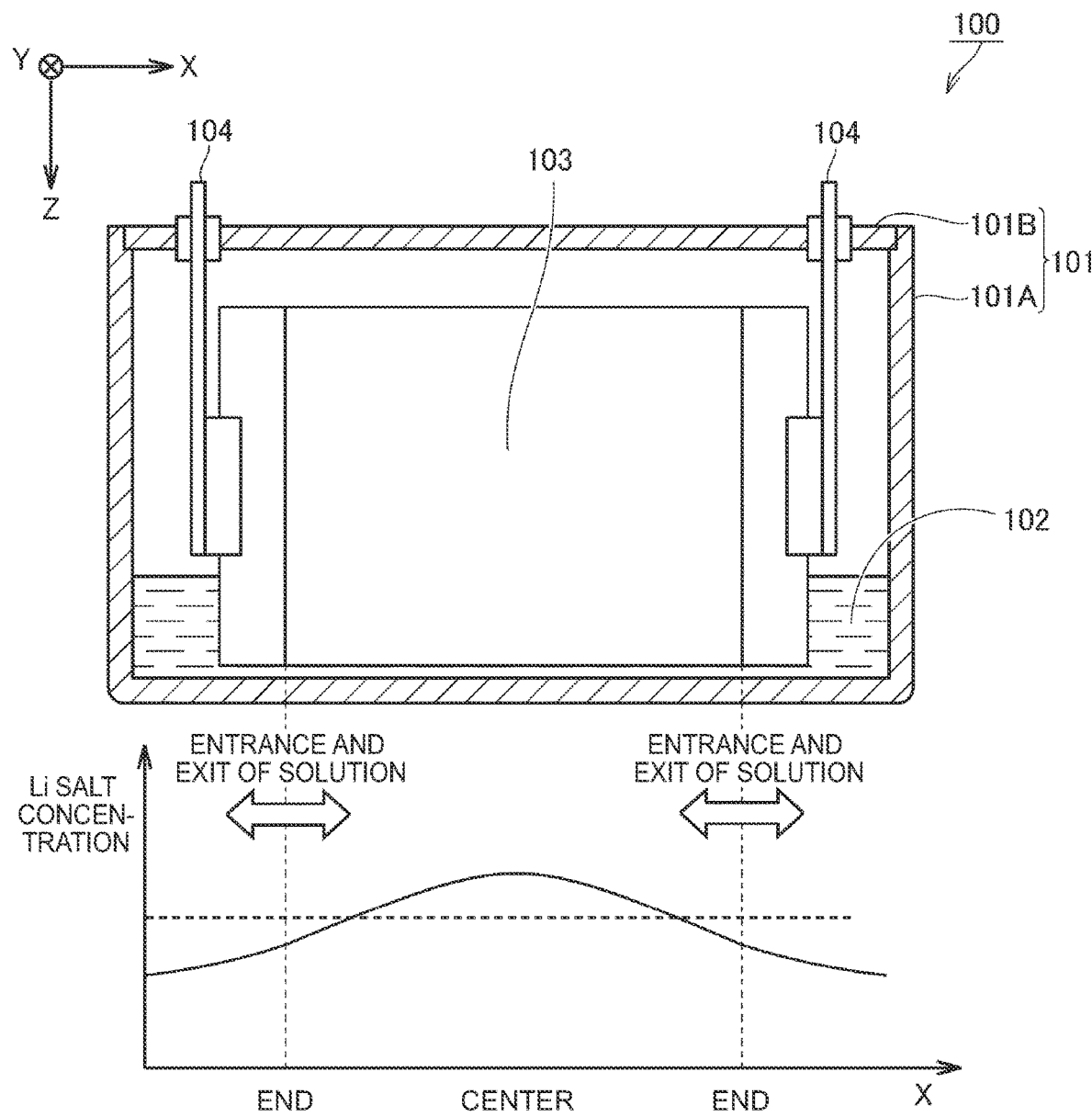
FIG. 1 is a schematic sectional view showing an example of a configuration of a lithium ion secondary battery according to an embodiment of the present disclosure.

FIG. 1 is a schematic sectional view showing an example of a configuration of a lithium ion secondary battery according to the present embodiment. A battery 100 includes a housing 101, an electrolyte solution, and an electrode group 103. The electrolyte solution and the electrode group 103 are housed in the housing 101. The electrode group 103 leads outside of the housing 101 via a current collecting terminal 104. The electrolyte solution includes a retained electrolyte solution (not shown) and an excess electrolyte solution 102. The retained electrolyte solution is retained in the electrode group 103. The excess electrolyte solution 102 is stored in a bottom of the housing 101.

<Housing>

The housing 101 shown in FIG. 1 has a rectangular shape (flat rectangular parallelepiped). However, the housing of the present embodiment may have a cylindrical shape. The housing 101 is typically made of a metal material such as aluminum (Al) and an Al alloy. However, as long as the housing has predetermined sealability, the housing may be made of, for example, an aluminum laminate film. The housing 101 includes, for example, a main body 101A and a lid 101B. The lid 101B is configured to close an opening of the main body 101A. The main body 101A and the lid 101B may be bonded together by, for example, laser welding. Although not shown in FIG. 1, the housing 101 may include, for example, an injection hole, a gas discharge valve, a current interruption mechanism (CID), and the like.

\<Electrode Group\>

Figure 2:
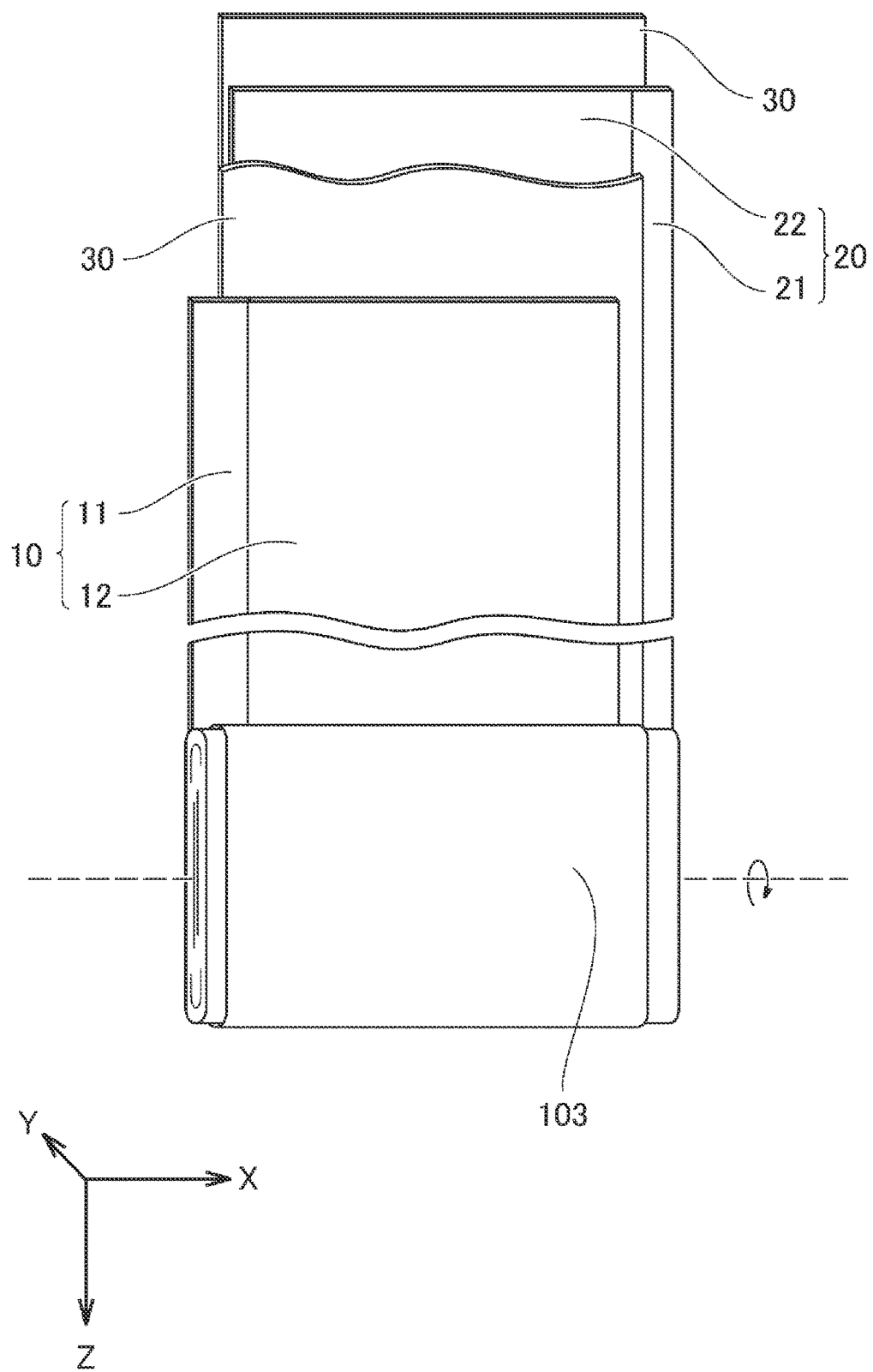
FIG. 2 is a schematic diagram showing an example of a configuration of an electrode group.

FIG. 2 is a schematic diagram showing an example of a configuration of an electrode group. The electrode group 103 includes a positive electrode 10, a negative electrode 20, and a separator 30. That is, the battery 100 includes at least the positive electrode 10, the negative electrode 20, and an electrolyte solution. All of the positive electrode 10, the negative electrode 20, and the separator 30 are a belt-shaped sheet. The separator 30 is disposed between the positive electrode 10 and the negative electrode 20. The electrode group 103 is a wound electrode group. That is, the electrode group 103 is formed by laminating the positive electrode 10 and the negative electrode 20 with the separator 30 therebetween and winding them in a spiral shape. The negative electrode 20 is wound around an outer peripheral side of the positive electrode 10.

The electrode group may be laminated. In the laminated electrode group (not shown), the positive electrode, the negative electrode, and the separator are, for example, a rectangular sheet. The laminated electrode group may be formed by alternately laminating the positive electrode and the negative electrode with the separator therebetween.

Figure 3:
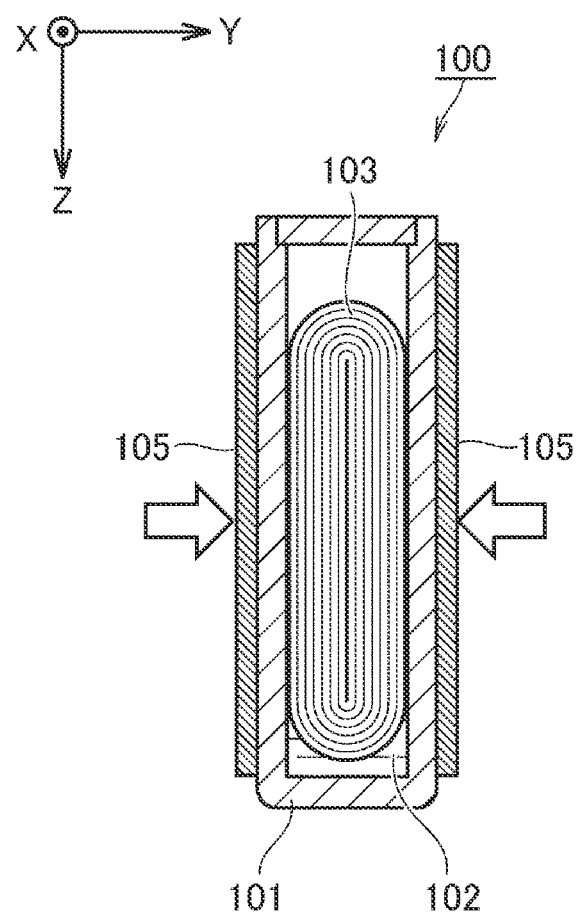
FIG. 3 is a schematic sectional view showing an example of a cross section parallel to an YZ plane in FIG. 1.

FIG. 3 is a schematic sectional view showing an example of a cross section parallel to an YZ plane in FIG. 1. The Y axis direction in FIG. 3 corresponds to a lamination direction of the positive electrode 10 and the negative electrode 20. The electrode group 103 is in contact with the housing 101 at the end in the Y axis direction. That is, the battery 100 is configured such that the housing 101 applies a compressive force to the electrode group 103 in the lamination direction of the positive electrode 10 and the negative electrode 20.

The electrode group 103 and the housing 101 may be in direct or indirect contact with each other. "Indirect contact" means, for example, a mode in which a packaging component made of a resin is interposed between the electrode group 103 and the housing 101. The packaging component may be, for example, polypropylene (PP) and the like. A plate 105 for compressing the electrode group 103 with the housing 101 therebetween may be disposed outside the housing 101. The plate 105 may have, for example, a comb-shaped projection on its surface. The plate 105 may be made of a metal or a resin.

The electrode group 103 expands and contracts according to charging and discharging. This is because the positive electrode 10 and the negative electrode 20 expand and contract. When the electrode group 103 expands and contracts, deflection occurs in the positive electrode 10 and the negative electrode 20. It is thought that, when deflection occurs in the positive electrode 10 and the negative electrode 20, an electrode reaction becomes irregular and deterioration (such as an increase in resistance) is accelerated.

As shown in FIG. 3, when the housing 101 applies a compressive force to the electrode group 103, deflection of the positive electrode 10 and the negative electrode 20 is prevented. On the other hand, since there is no room for expansion of the electrode group 103, the negative electrode 20 which is a soft component among components of the electrode group 103 is easily crushed. When the negative electrode 20 is crushed, the electrolyte solution having permeated into the negative electrode 20 is extruded. As shown in FIG. 1, the extruded electrolyte solution flows from the end of the electrode group 103 in a width direction (the X axis direction in FIG. 1) to the outside of the electrode group 103. The electrolyte solution that flows to the outside mixes with the excess electrolyte solution 102.

In the electrolyte solution extruded from the negative electrode 20 during high rate charging, a Li salt (supporting electrolyte) concentration tends to decrease. Therefore, the Li salt concentration of the excess electrolyte solution 102 decreases. When the electrode group 103 relaxes, the excess electrolyte solution 102 is caused to return to the inside of the electrode group 103. However, it is difficult for the electrolyte solution to return completely to the center of the electrode group 103. Therefore, in the X axis direction, the electrolyte solution with a low Li salt concentration tends to remain in the vicinity of the end of the electrode group 103. Thus, nonuniformity in the Li salt concentration occurs in the X axis direction (the width direction of the electrode group 103). That is, the Li salt concentration is high at the center of the electrode group 103, and the Li salt concentration is low at the end of the electrode group 103. It is thought that the electrode reaction becomes irregular and an increase in resistance is accelerated due to nonuniformity in the Li salt concentration.

In the present embodiment, it is thought that, since the negative electrode 20 has a permeation path of the electrolyte solution and the hardness of the negative electrode 20 is improved, the electrolyte solution is prevented from being extruded from the negative electrode 20.

\<Negative Electrode\>

Figure 4:
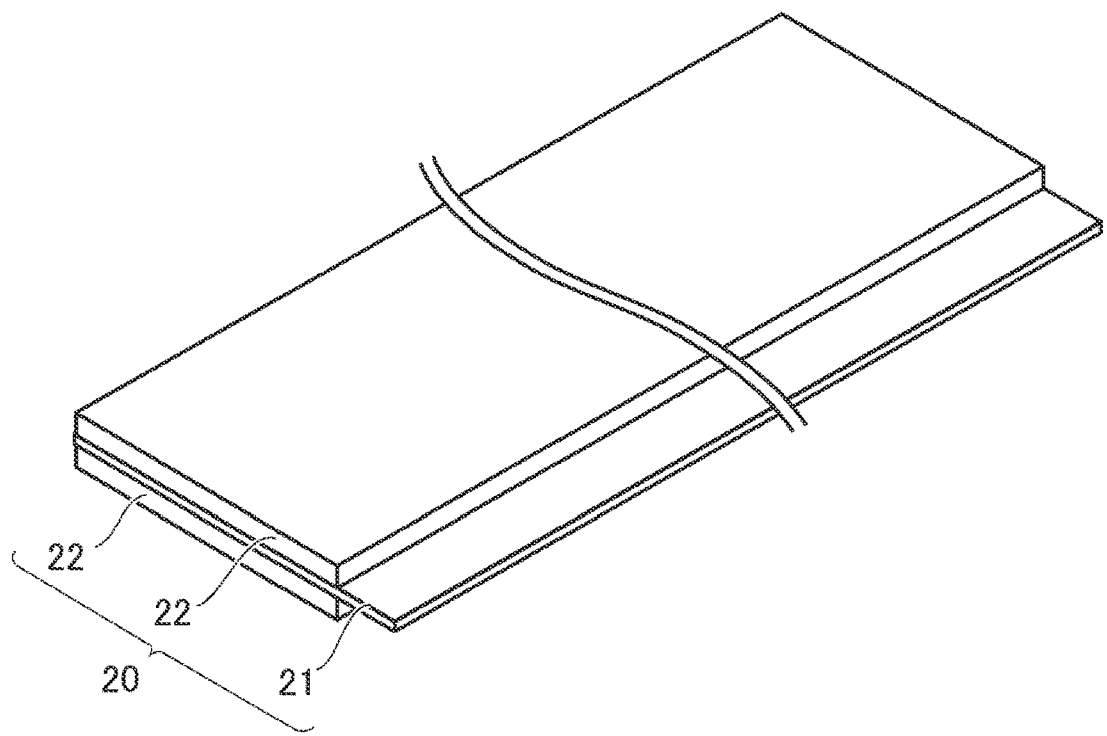
FIG. 4 is a schematic diagram showing an example of a configuration of a negative electrode.

FIG. 4 is a schematic diagram showing an example of a configuration of a negative electrode. The negative electrode 20 is a belt-shaped sheet. The negative electrode 20 includes a negative electrode current collector 21 and a negative electrode mixture layer 22. The negative electrode mixture layer 22 is formed on a surface of the negative electrode current collector 21. The negative electrode mixture layer 22 is disposed on both front and back surfaces of the negative electrode current collector 21. At the end of the negative electrode 20 in a width direction (corresponds to the X axis direction in FIG. 1), a part of the negative electrode current collector 21 is exposed from the negative electrode mixture layer 22. The exposed negative electrode current collector 21 is connected to the current collecting terminal 104.

The negative electrode current collector 21 may have, for example, a thickness of 3 μm to 30 μm. The negative electrode current collector 21 may be, for example, a copper (Cu) foil. The Cu foil may be a pure Cu foil or may be a Cu alloy foil.

Figure 5:
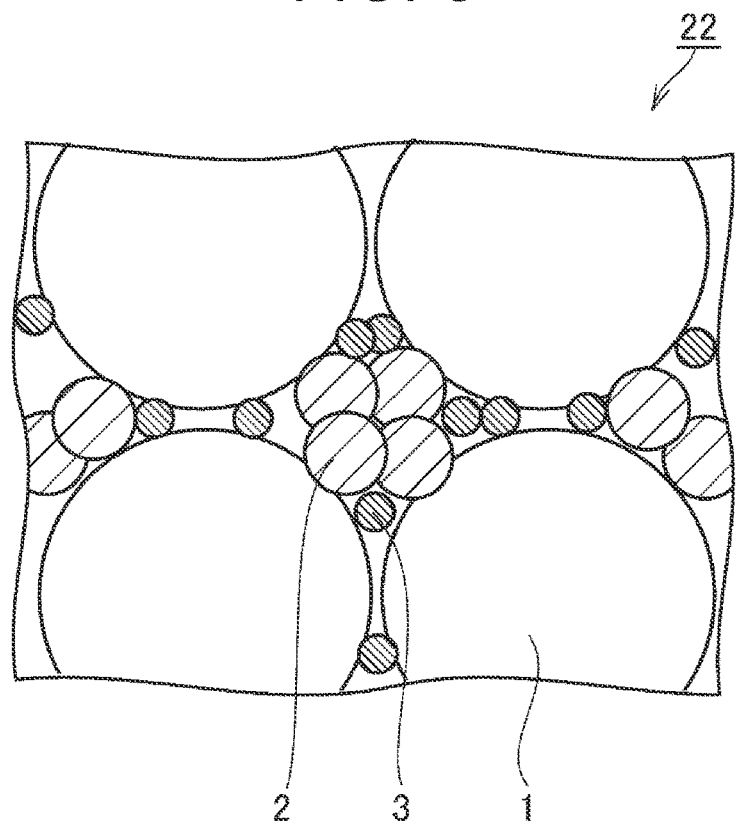
FIG. 5 is a conceptual diagram showing particles disposed in a negative electrode mixture layer.

The negative electrode mixture layer 22 may have, for example, a thickness of 10 μm to 150 μm. FIG. 5 is a conceptual diagram showing particles disposed in the negative electrode mixture layer. The negative electrode mixture layer 22 includes graphite particles 1, inorganic filler particles 2, LTO particles 3, and a water-based binder (not shown). The negative electrode mixture layer 22 includes, for example, 75 mass % to 97.5 mass % of the graphite particles 1, 1 mass % to 10 mass % of the inorganic filler particles 2, 1 mass % to 10 mass % of the LTO particles 3, and 0.5 mass % to 5 mass % of a water-based binder.

(Graphite Particles)

The graphite particles 1 are particles containing graphite. The graphite particles 1 function as a negative electrode active material. That is, the graphite particles 1 occlude and release Li ions. The graphite particles 1 may have, for example, an average primary particle size of 6 μm to 30 μm, an average primary particle size of 8 μm to 20 μm, or an average primary particle size of 8 μm to 16 μm.

Graphite may be natural graphite or artificial graphite. In consideration of a capacity, graphite is preferably natural graphite. As long as graphite is contained, graphite particles may further contain, for example, amorphous carbon. For example, graphite particles may have a core-shell structure. That is, graphite particles may include spheroidized graphite particles (core) and amorphous carbon (shell) covering surfaces of the spheroidized graphite particles. The spheroidized graphite particles refer to scaly graphite particles that have undergone a spheroidizing treatment. The spheroidizing treatment refers to, for example, a treatment in which an external form of scaly graphite particles is changed to become similar to a spherical shape due to friction in an air flow and pulverization.

(Inorganic Filler Particles)

The inorganic filler particles 2 are inorganic compound particles. The shape of the inorganic filler particles 2 should not be particularly limited. The inorganic filler particles 2 may be, for example, spherical, plate-like, rod-like, or needle-like. The inorganic filler particles 2 fill voids between the graphite particles 1. Thus, the hardness of the negative electrode mixture layer 22 is improved. The average primary particle size of the inorganic filler particles 2 is ½ (half) or less of the average primary particle size of the graphite particles 1. The average primary particle size of the inorganic filler particles 2 is measured while the inorganic filler particles 2 are dispersed in a liquid to become primary particles. A measurement specimen (dispersion solution) can be prepared using a method according to JISZ8824 "Specimen preparation for particle size measurement—method of dispersing powder in a liquid."

The average primary particle size of the inorganic filler particles 2 may be, for example, 3/10 (3 tenths) or less of the average primary particle size of the graphite particles 1. The average primary particle size of the inorganic filler particles 2 may be, for example, 1/10 (1 tenth) or more of the average primary particle size of the graphite particles 1. More specifically, the inorganic filler particles 2 may have, for example, an average primary particle size of 1 μm or more and 5 μm or less, an average primary particle size of 1 μm or more and 3 μm or less, or an average primary particle size of 3 μm or more and 5 μm or less.

The inorganic filler particles 2 may be, for example, boehmite particles, alumina particles, aluminum hydroxide particles, magnesia (MgO) particles, zirconia ($ZrO_2$) particles, or the like. The inorganic filler particles 2 may be used alone or in a combination of two or more thereof. Boehmite particles, alumina particles, and aluminum hydroxide particles exhibit a hydrophilicity suitable for the present embodiment. Thus, preferably, the inorganic filler particles 2 are at least one selected from the group consisting of boehmite particles, alumina particles, and aluminum hydroxide particles. More preferably, the inorganic filler particles 2 are boehmite particles.

(LTO Particles)

The LTO particles 3 are lithium titanate ($Li_4Ti_5O_{12}$) particles. The shape of the LTO particles 3 should not be particularly limited. The LTO particles 3 may be, for example, spherical, plate-like, rod-like, or needle-like. The LTO particles 3 have a more favorable hydrophilicity than the inorganic filler particles 2. The LTO particles 3 have an average primary particle size of 1 μm or less. The LTO particles 3 may have an average primary particle size of 0.7 μm or more and 1 μm or less. In the same manner as in the inorganic filler particles 2, the average primary particle size of the LTO particles 3 is measured while the LTO particles 3 are dispersed in a liquid to become primary particles.

The particle size ratio (a ratio of the average primary particle size of the LTO particles 3 with respect to the average primary particle size of the inorganic filler particles 2) is calculated by dividing the average primary particle size of the LTO particles 3 by the average primary particle size of the inorganic filler particles 2. In the present embodiment, the particle size ratio is one or less. When the LTO particles 3 have a favorable hydrophilicity and the particle size ratio is one or less, the LTO particles 3 can enter small voids that are not filled with the inorganic filler particles 2. Thus, it is thought that the hardness of the negative electrode mixture layer 22 is significantly improved. The voids in which the inorganic filler particles 2 and the LTO particles 3 are disposed may serve as a permeation path of the electrolyte solution. Therefore, the battery 100 is expected to exhibit excellent high rate tolerance.

The particle size ratio is preferably 0.20 or more. Accordingly, the hardness of the negative electrode mixture layer 22 is expected to be further improved and the high rate tolerance is expected to be improved. The particle size ratio is more preferably 0.23 or more. Thus, the hardness of the negative electrode mixture layer 22 is expected to be even further improved and the high rate tolerance is expected to be improved.

(Water-Based Binder)

The water-based binder of the present embodiment refers to a binder that is dispersible in an aqueous solvent or a binder that is soluble in an aqueous solvent. The aqueous solvent refers to water itself or a mixture containing an organic solvent to be mixed with water and water. As the organic solvent to be mixed with water, for example, ethanol, acetone, and tetrahydrofuran may be exemplified. As the water-based binder, for example, carboxymethyl cellulose (CMC), styrene butadiene rubber (SBR), polyacrylic acid (PAA), acrylic acid ester copolymer, polytetrafluoroethylene (PTFE), polyvinyl alcohol (PVA), and polyvinyl butyral (PVB) may be exemplified. Water-based binders may be used alone or in a combination of two or more thereof (Spring Constant)

The hardness of the negative electrode 20 can be represented by a spring constant. When the spring constant of the negative electrode 20 increases, the negative electrode 20 is thought to be harder. The spring constant can be measured by the following method. A square sample is cut out from the negative electrode 20. The entire surface of the sample includes the negative electrode mixture layer 22. The size of the sample is determined according to the shape of the negative electrode 20. When the negative electrode 20 is a belt-shaped sheet (when the negative electrode is used for a wound electrode group), a length of one side of the square is half of a width of the negative electrode mixture layer 22. Here, the width indicates a size in a direction orthogonal to a longitudinal direction. For example, when the width of the negative electrode mixture layer 22 is 100 mm, a length of one side of the sample is 50 mm. That is, the size of the sample is 50 mm×50 mm.

When the negative electrode is a rectangular sheet (when the negative electrode is used for a laminated electrode group), a length of one side of the square is half of a short side of the negative electrode mixture layer. The short side indicates a shorter side of a rectangle. When the negative electrode mixture layer is square, all sides are regarded as short sides. For example, when the negative electrode mixture layer is 80 mm×60 mm, a length of one side of the sample is 30 mm. That is, the size of the sample is 30 mm×30 mm.

Here, the square in this specification does not indicate only a geometrically perfect square. In this specification, when a length of each side of the rectangle is 97% or more and 103% or less of an average value of lengths of four sides, the rectangle is regarded as a square.

Here, 50 samples are prepared. The 50 samples are laminated. The laminated 50 samples are interposed between two stainless steel (SUS) plates. A compression testing machine is prepared. As the compression testing machine, for example, an "Autograph precision universal testing machine" commercially available from Shimadzu Corporation or a machine equivalent thereto is used. On a sample stage of the compression testing machine, 50 samples are disposed together with the SUS plate.

A predetermined load is applied in a lamination direction (thickness direction) of the sample. Displacement in the thickness direction (lamination direction) at this time is measured. According to the following formula: spring constant (unit: kN/mm)=load (unit: kN)/displacement in thickness direction (unit: mm), the spring constant is calculated.

When the spring constant of the negative electrode 20 increases, crushing of the negative electrode 20 becomes more difficult, and improvement in the high rate tolerance can be expected. The negative electrode 20 of the present embodiment can have, for example, a spring constant of 251 kN/mm or more. The negative electrode 20 can have, for example, a spring constant of 253 kN/mm or more, or a spring constant of 262 kN/mm or more. An upper limit value of the spring constant should not be particularly limited. The negative electrode 20 may have, for example, a spring constant of 281 kN/mm or less.

(High Rate Tolerance after High Temperature Storage)

In the present embodiment, improvement in high rate tolerance after high temperature storage can also be expected. High rate tolerance of the battery deteriorates due to high temperature storage. Deterioration of high rate tolerance is thought to progress as will be described below.

Figure 6:
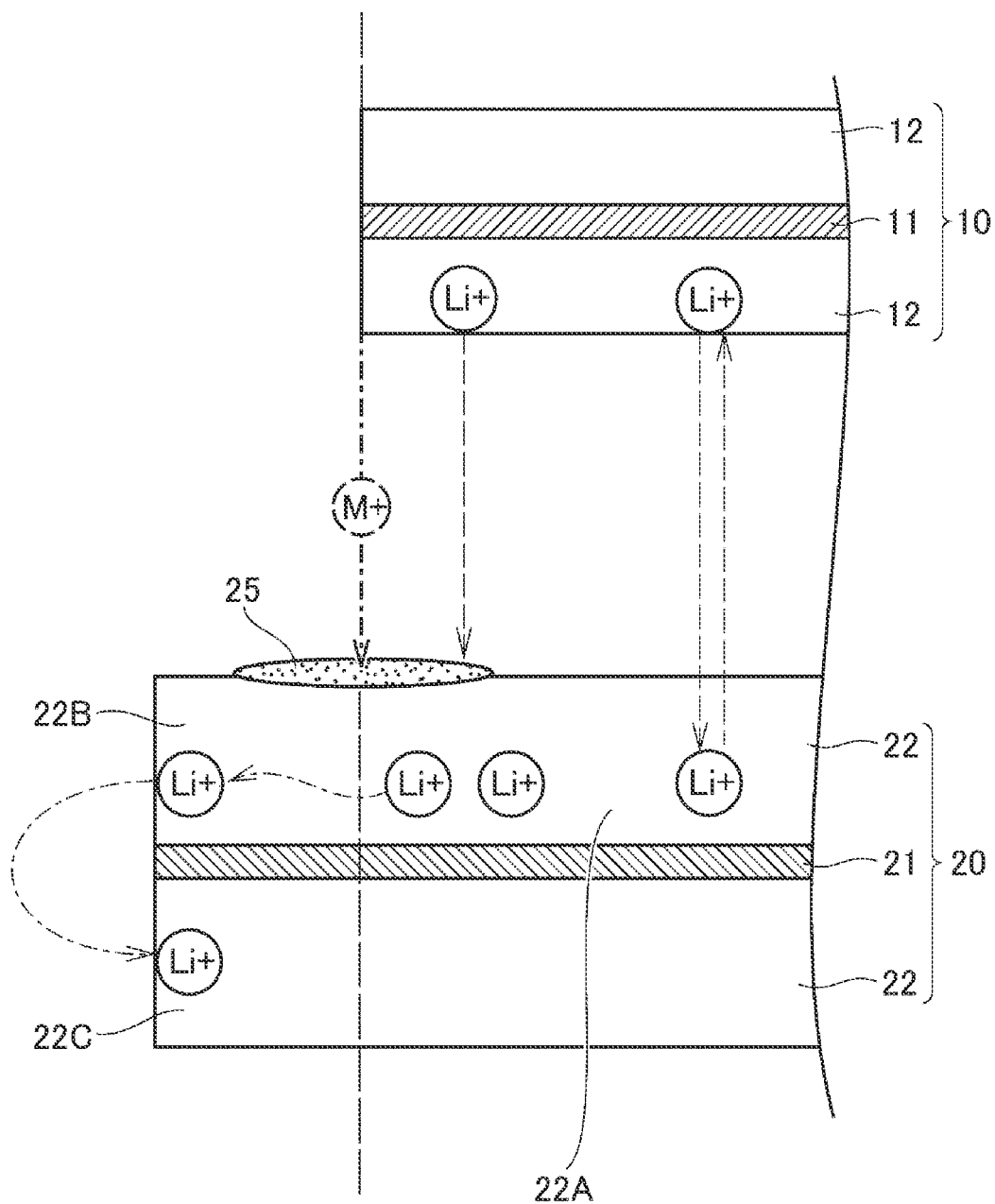
FIG. 6 is a conceptual diagram for explaining a deterioration mechanism during high temperature storage.

FIG. 6 is a conceptual diagram for explaining a deterioration mechanism during high temperature storage. FIG. 6 schematically shows an end of a winding of the wound electrode group 103. As described above, when the negative electrode 20 is wound around an outer peripheral side of the positive electrode 10, the negative electrode 20 is disposed at the end of the winding. The negative electrode 20 disposed at the end of the winding includes an opposing region 22A that faces the positive electrode 10, and non-opposing regions 22B and 22C that do not face the positive electrode 10.

In general charging and discharging, no Li ions (Li$^+$) diffuse into the non-opposing regions 22B and 22C. However, when the battery 100 is stored in a charged state (in a state in which Li ions remain in the opposing region 22A), Li ions are thought to diffuse from the opposing region 22A to the non-opposing region 22B. The Li ions diffusing into the non-opposing region 22B are thought to further diffuse into the non-opposing region 22C on the back side.

Figure 7:
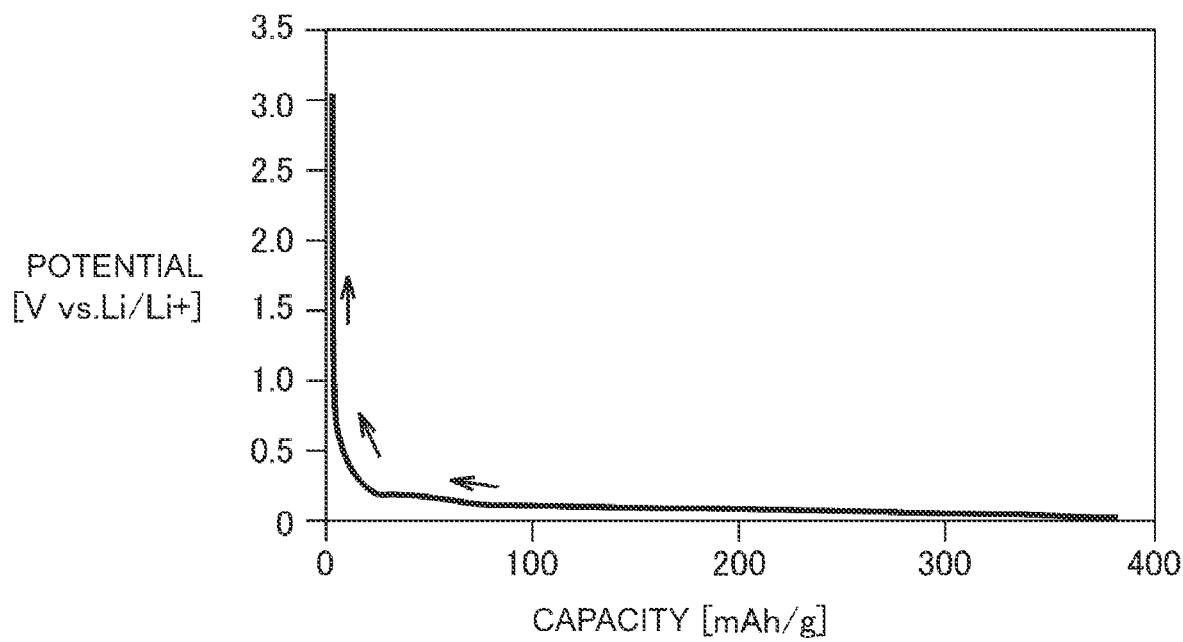
FIG. 7 is a graph showing a charge profile of graphite particles alone.

A potential in the opposing region 22A increases because Li ions are released. FIG. 7 is a graph showing a charge profile of graphite particles alone. When Li ions diffuse (discharge), the potential of the opposing region 22A is thought to increase along arrows in the graph. As shown in the graph in FIG. 7, the potential sharply increases at the end of discharge. Thus, within the opposing region 22A, in a region adjacent to the non-opposing region 22B, the potential of the negative electrode locally increases. When the potential of the negative electrode locally increases, the potential of the positive electrode also locally increases. As a result, metal ions (M$^+$) are eluted from the positive electrode 10. The eluted metal ions (M$^+$) move to the negative electrode 20 and are precipitated on the surface thereof. Thus, a metal film 25 is formed on the surface of the negative electrode 20. In a portion in which the metal film 25 is formed, since acceptance of Li ions is suppressed, Li precipitation tends to occur locally. That is, high rate tolerance deteriorates.

Figure 8:
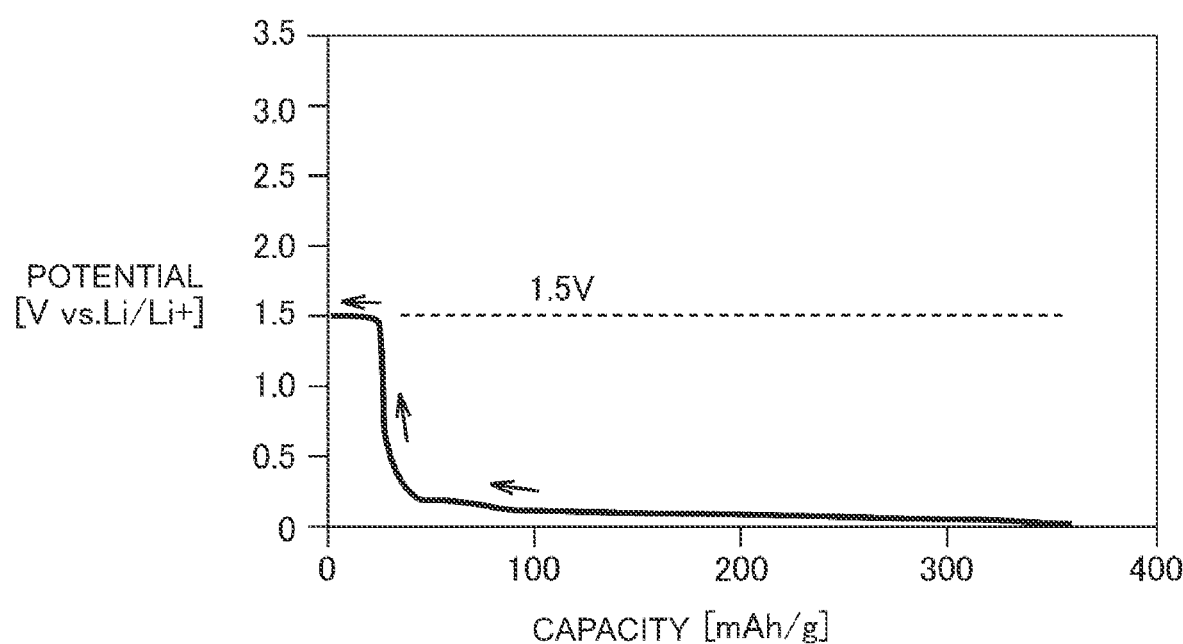
FIG. 8 is a graph showing a charge profile of a mixture of graphite particles and LTO particles.

As described above, in the present embodiment, the negative electrode mixture layer 22 includes the LTO particles 3. The LTO particles 3 can occlude and release Li ions at a higher potential than the graphite particles 1. FIG. 8 is a graph showing a charge profile of a mixture of graphite particles and LTO particles. When the graphite particles 1 and the LTO particles 3 coexist, since an occlusion and release potential (about 1.5 V vs. Li/Li$^+$) of the LTO particles 3 serves as a buffer for potential rise, sharp potential rise at the end of discharge is thought to be prevented. Thus, metal ions (M$^+$) are prevented from being eluted from the positive electrode 10. That is, in the present embodiment, deterioration of high rate tolerance after high temperature storage is thought to be prevented.

<Positive Electrode>

Figure 9:
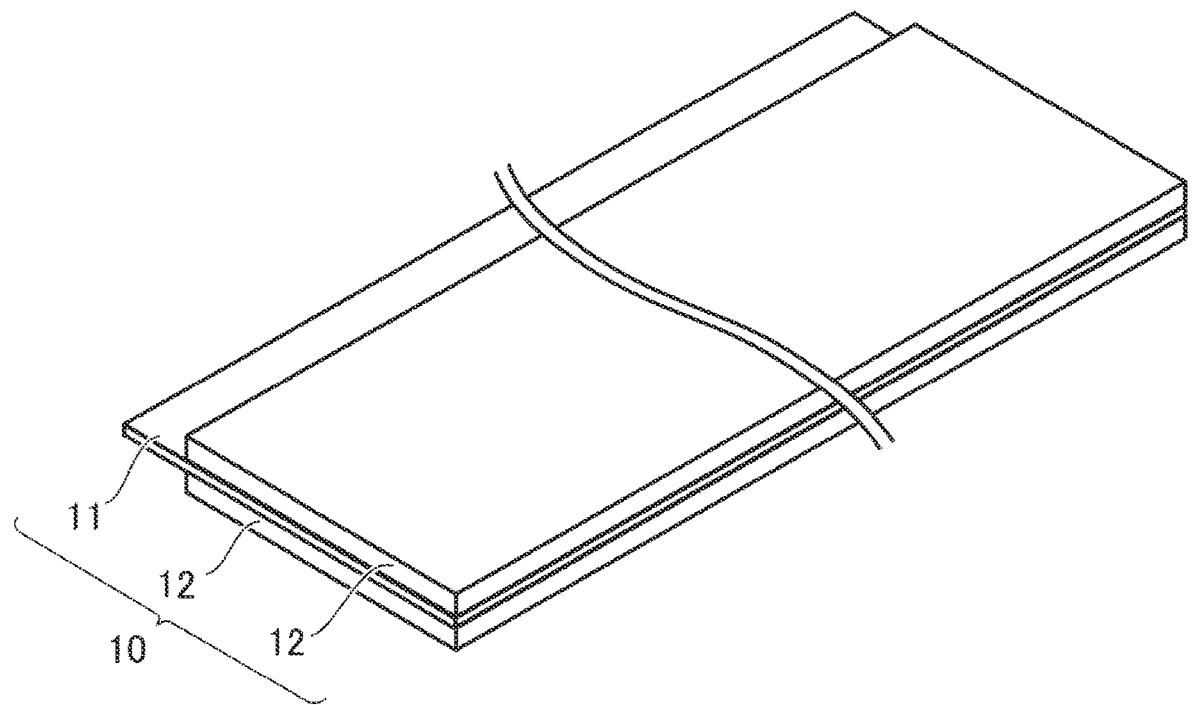
FIG. 9 is a schematic diagram showing an example of a configuration of a positive electrode.

FIG. 9 is a schematic diagram showing an example of a configuration of a positive electrode. The positive electrode 10 is a belt-shaped sheet. The positive electrode 10 includes a positive electrode current collector 11 and a positive electrode mixture layer 12. The positive electrode mixture layer 12 is formed on a surface of the positive electrode current collector 11. The positive electrode mixture layer 12 is disposed on both front and back surfaces of the positive electrode current collector 11. At an end of the positive electrode 10 in a width direction (corresponds to the X axis direction in FIG. 1), a part of the positive electrode current collector 11 is exposed from the positive electrode mixture layer 12. The exposed positive electrode current collector 11 is connected to the current collecting terminal 104.

The positive electrode current collector 11 may have, for example, a thickness of 3 μm to 30 μm. The positive electrode current collector 11 may be, for example, an aluminum (Al) foil. The Al foil may be a pure Al foil, or may be an Al alloy foil.

The positive electrode mixture layer 12 may have, for example, a thickness of 10 μm to 150 μm. The positive electrode mixture layer 12 includes positive electrode active material particles, conductive particles, a binder, and the like. The positive electrode mixture layer 12 includes, for example, 80 mass % to 98 mass % of positive electrode active material particles, 1 mass % to 15 mass % of conductive particles, and 1 mass % to 5 mass % of a binder.

The positive electrode active material particles are particles containing a positive electrode active material. The average particle size of the positive electrode active material particles may be, for example, 1 μm to 20 μm. The average particle size of the positive electrode active material particles in this specification refers to an average particle size of secondary particles (an aggregate of primary particles). The average particle size of the positive electrode active material particles refers to a particle size of cumulative 50% from the side of fine particles in a volume-based particle size distribution measured by a laser diffraction scattering method. The positive electrode active material may be, for example, $LiCoO_2$, $LiNiO_2$, $LiMnO_2$, $LiMn_2O_4$, $LiNi_aCo_bMn_cO_2$ (where, 0<a<1, 0<b<1, 0<c<1, a+b+c=1), or $LiFePO_4$. As the positive electrode active material represented by $LiNi_aCo_bMn_cO_2$, for example, $LiNi_{1/3}Co_{1/3}RMn_{1/3}O_2$ may be exemplified. The positive electrode active materials may be used alone or in a combination of two or more thereof.

The conductive particles are particles containing a conductive material. The conductive material should not be particularly limited. The conductive material may be, for example, acetylene black (AB), thermal black, furnace black, or vapor grown carbon fibers (VGCF). The conductive materials may be used alone or in a combination of two or more thereof.

The binder included in the positive electrode mixture layer 12 may be an organic solvent type binder, and may be the above water-based binder. The organic solvent type binder refers to a binder that is dispersible in an organic solvent or a binder that is soluble in an organic solvent. As the organic solvent, for example, N-methyl-2-pyrrolidone (NMP) may be exemplified. As the organic solvent type binder, for example, polyvinylidene fluoride (PVdF) may be exemplified.

<Separator>

The separator 30 is disposed between the positive electrode 10 and the negative electrode 20. The separator 30 is an electrically insulating porous film. The separator 30 electrically isolates the positive electrode 10 and the negative electrode 20. The separator 30 may have, for example, a thickness of 5 μm to 30 μm.

The separator 30 is made of, for example, a porous polyethylene (PE) film or a porous polypropylene (PP) film. The separator 30 may include a multilayer structure. For example, the separator 30 may be formed by laminating a porous PP film, a porous PE film, and a porous PP film in that order. The separator 30 may include a heat resistant layer on its surface. The heat resistant layer includes a heat resistant material. As the heat resistant material, examples include metal oxide particles such as alumina and a high melting point resin such as a polyimide.

<Electrolyte Solution>

The electrolyte solution is a liquid electrolyte that includes a solvent and a supporting electrolyte. The solvent is aprotic. The solvent includes, for example, a cyclic carbonate and a chain carbonate. The mixing ratio between the cyclic carbonate and the chain carbonate may be, for example, "cyclic carbonate:chain carbonate=1:9 to 5:5" (volume ratio).

As the cyclic carbonate, for example, ethylene carbonate (EC), propylene carbonate (PC), butylene carbonate (BC), vinylene carbonate (VC), and fluoroethylene carbonate (FEC) may be exemplified. The cyclic carbonates may be used alone or in a combination of two or more thereof. As the chain carbonate, dimethyl carbonate (DMC), ethyl methyl carbonate (EMC), diethyl carbonate (DEC), and the like may be exemplified. The chain carbonates may be used alone or in a combination of two or more thereof.

The solvent may include, for example, a lactone, a cyclic ether, a chain ether, and a carboxylic ester. As the lactone, for example, γ-butyrolactone (GBL) and δ-valerolactone may be exemplified. As the cyclic ether, for example, tetrahydrofuran (THF), 1,3-dioxolane, and 1,4-dioxane may be exemplified. As the chain ether, 1,2-dimethoxyethane (DME), and the like may be exemplified. As the carboxylic ester, for example, methyl formate (MF), methyl acetate (MA), and methyl propionate (MP) may be exemplified.

The supporting electrolyte is a Li salt. The Li salt is dissolved in a solvent. The electrolyte solution may include, for example, 0.5 mol/l to 2.0 mol/l of the Li salt. As the Li salt, for example, $LiPF_6$, $LiBF_4$, $Li[N(FSO_2)_2]$, $Li[N(CF_3SO_2)_2]$, $Li[B(C_2O_4)_2]$ (commonly known as "LiBOB"), and $LiPO_2F_2$ may be exemplified. These Li salts may be used alone or in a combination of two or more thereof.

The electrolyte solution may further include various functional additives in addition to the solvent and the supporting electrolyte. The electrolyte solution may include, for example, 1 mass % to 5 mass % of a functional additive. The functional additive may include, for example, a gas generating agent and a film forming agent. As a specific example, for example, cyclohexylbenzene (CHB), biphenyl (BP), ethylene sulfite (ES), propane sultone (PS), and the like may be exemplified.

<Applications>

The battery 100 of the present embodiment is suitable for applications for which charging and discharging at an extremely high current rate are required. As such applications, for example, power sources of a hybrid vehicle (HV), a plug-in hybrid vehicle (PHV), and an electric vehicle (EV) may be exemplified. However, the application of the battery 100 of the present embodiment should not be limited to vehicle applications. The battery 100 of the present embodiment can be applied to any application.

<Method of Producing Lithium Ion Secondary Battery>

Figure 10:
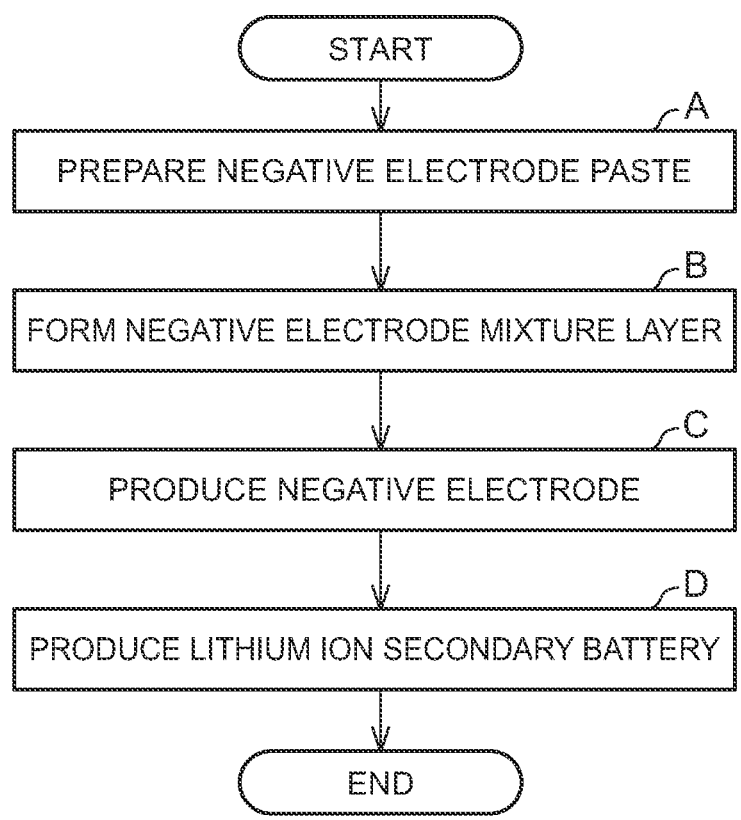
FIG. 10 is a flowchart schematically showing a method of producing a lithium ion secondary battery according to an embodiment of the present disclosure.

FIG. 10 is a flowchart schematically showing a method of producing a lithium ion secondary battery according to the present embodiment. The production method of the present embodiment includes "(A) preparation of a negative electrode paste," "(B) formation of a negative electrode mixture layer," "(C) production of negative electrode" and "(D) production of lithium ion secondary battery." Hereinafter, the production method of the present embodiment will be described according to procedures.

<(A) Preparation of Negative Electrode Paste>

In the production method of the present embodiment, the graphite particles 1, the inorganic filler particles 2, the LTO particles 3, a water-based binder, and an aqueous solvent are mixed to prepare a negative electrode paste.

First, the graphite particles 1, the inorganic filler particles 2, the LTO particles 3, a water-based binder, and an aqueous solvent are prepared. The inorganic filler particles 2 have an average primary particle size that is ½ or less of the average primary particle size of the graphite particles 1. The LTO particles 3 have an average primary particle size of 1 μm or less. The inorganic filler particles 2 and the LTO particles 3 are combined so that the particle size ratio is one or less. Details of such materials are the same as described above.

In the mixing operation, a general stirring and mixing device may be used. The graphite particles 1, the inorganic filler particles 2, the LTO particles 3, a water-based binder, and an aqueous solvent are mixed at a predetermined mass ratio. Thus, a negative electrode paste is prepared. The negative electrode paste is prepared to have, for example, a solid fraction of 50 mass % to 70 mass %. The solid fraction indicates a mass ratio of components other than the solvent. Mixing conditions (such as a mixing time and a stirring speed) are appropriately adjusted according to physical properties of powder materials, a treatment amount, and the like.

<(B) Formation of Negative Electrode Mixture Layer>

In the production method of the present embodiment, the negative electrode paste is applied to a surface of the negative electrode current collector 21 and dried to form the negative electrode mixture layer 22.

In the coating operation, for example, a die coater or a gravure coater may be used. In the drying operation, for example, a hot-air drying furnace or an infrared drying furnace may be used. In the present embodiment, the inorganic filler particles 2 have an average primary particle size that is ½ or less of the average primary particle size of the graphite particles 1. The LTO particles 3 have an average primary particle size of 1 μm or less and a particle size ratio is one or less. When the negative electrode paste is dried, the inorganic filler particles 2 and the LTO particles 3 are efficiently disposed in gaps between the graphite particles 1.

<(C) Production of Negative Electrode>

In the production method of the present embodiment, the negative electrode 20 including the negative electrode current collector 21 and the negative electrode mixture layer 22 is produced.

The negative electrode mixture layer 22 is compressed to have a predetermined thickness. In the compression operation, for example, a rolling machine is used. In the negative electrode mixture layer 22 of the present embodiment, since the inorganic filler particles 2 and the LTO particles 3 fill voids between the graphite particles 1, it is possible to obtain a sufficient hardness at an appropriate pressure. Further, the inorganic filler particles 2 and the LTO particles 3 prevent voids from being crushed due to compression. Thus, a permeation path of the electrolyte solution is secured. The negative electrode current collector 21 and the negative electrode mixture layer 22 are collectively cut into a predetermined shape (for example, a belt shape) according to specifications of the battery 100. Thus, the negative electrode 20 including the negative electrode current collector 21 and the negative electrode mixture layer 22 is produced.

<(D) Production of Lithium Ion Secondary Battery>

In the production method of the present embodiment, a lithium ion secondary battery including at least the positive electrode 10, the negative electrode 20, and an electrolyte solution is produced.

The positive electrode 10 may be produced according to a method in the related art. For example, positive electrode active material particles, conductive particles, a binder and a solvent are mixed to prepare a positive electrode paste. The positive electrode paste is applied to a surface of the positive electrode current collector 11 and dried to form the positive electrode mixture layer 12. The positive electrode mixture layer 12 is rolled. The positive electrode current collector 11 and the positive electrode mixture layer 12 are cut into a predetermined shape (for example, a belt-shape) according to specifications of the battery 100. Thus, the positive electrode 10 including the positive electrode current collector 11 and the positive electrode mixture layer 12 is produced.

For example, as shown in FIG. 2, the positive electrode 10 and the negative electrode 20 are laminated with the separator 30 therebetween, and these are wound in a spiral shape. Thus, the electrode group 103 may be formed. The electrode group 103 may be wound in a cylindrical shape and be then flattened by compression molding.

For example, the housing 101 shown in FIG. 1 is prepared. The electrode group 103 is electrically connected to the current collecting terminal 104. The electrode group 103 is housed in the housing 101. The main body 101A and the lid 101B are bonded by, for example, laser welding. For example, a predetermined amount of an electrolyte solution is injected from an injection hole (not shown) provided in the housing 101. The injection hole is sealed with a plug. Thus, the housing 101 is hermetically sealed, and the battery 100 is completed.

Examples will be described below. However, the following examples do not limit the scope of the present disclosure.

Example 1

The following materials were prepared. The graphite particles 1 (average primary particle size=10 μm), the inorganic filler particles 2: boehmite (average primary particle size=1 μm), the LTO particles 3 (average primary particle size=0.7 μm), a water-based binder: CMC, and SBR, an aqueous solvent: deionized water (water), and the negative electrode current collector 21: Cu foil (thickness=10 μm)

<(A) Preparation of Negative Electrode Paste>

The graphite particles 1, the inorganic filler particles 2, the LTO particles 3, the water-based binder, and the aqueous solvent were mixed using a stirring and mixing device to prepare a negative electrode paste. A solid content composition of the negative electrode paste was "graphite particles: inorganic filler particles:LTO particles:CMC:SBR=88:5:5:1:1 (mass ratio)."

<(B) Formation of Negative Electrode Mixture Layer>

The negative electrode paste was applied to surfaces (both front and back surfaces) of the negative electrode current collector 21 using a die coater and dried to form the negative electrode mixture layer 22.

<C) Production of Negative Electrode>

The negative electrode mixture layer 22 was compressed to a predetermined thickness using a rolling machine. The negative electrode current collector 21 and the negative electrode mixture layer 22 were collectively cut into a belt-shape. Thus, the negative electrode 20 which is a belt-shaped sheet was produced. The size of the width of the negative electrode mixture layer 22 was 105 mm.

<(D) Production of Lithium Ion Secondary Battery>

The following materials were prepared. Positive electrode active material particles: $LiNi_{1/3}Co_{1/3}Mn_{1/3}O_2$ (average particle size=5 μm, hereinafter abbreviated as "NCM"), conductive particles:AB, binder:PVdF, solvent:NMP, and the positive electrode current collector 11:Al foil (thickness=15 μm)

The positive electrode active material particles, the conductive particles, the binder, and the solvent were mixed using a stirring and mixing device to prepare a positive electrode paste. A solid content composition of the positive electrode paste was "NCM:AB:PVdF=92:5:3 (mass ratio)." The positive electrode paste was applied to surfaces (both front and back surfaces) of the positive electrode current collector 11 and dried to form the positive electrode mixture layer 12. The positive electrode mixture layer 12 was compressed to a predetermined thickness using a rolling machine. The positive electrode current collector 11 and the positive electrode mixture layer 12 were collectively cut into a belt-shape. Thus, the positive electrode 10 which is a belt-shaped sheet was produced. The size of the width of the positive electrode mixture layer 12 was 100 mm.

The separator 30 having a thickness of 24 μm was prepared. The separator 30 was formed by laminating a porous PP film, a porous PE film, and a porous PP film in that order. The positive electrode 10 and the negative electrode 20 were laminated with the separator 30 therebetween, and these were wound in a spiral shape. Thus, the electrode group 103 was formed. The current collecting terminal 104 was electrically connected to the electrode group 103. The electrode group 103 was housed in the housing 101. The main body 101A and the lid 101B were bonded together by laser welding.

An electrolyte solution including the following components was prepared. Solvent: [EC:DMC:EMC=3:3:4 (volume ratio)], Li salt: $LiPF_6$ (1 mol/l)

A predetermined amount of the electrolyte solution was injected from an injection hole provided in the housing 101. The injection hole was sealed with a plug. In the Y axis direction in FIG. 2, the battery 100 was interposed between two plates 105 (made of SUS). The plates 105 were fixed such that a load of 500 kgf was applied to the battery 100 by the plates 105. That is, the battery 100 was formed such that the housing 101 applied a compressive force to the electrode group 103 in the lamination direction of the positive electrode 10 and the negative electrode 20. Thus, the battery 100 was produced.

Examples 2 to 6

The batteries 100 were produced according to the same production method as in Example 1 except that average primary particle sizes of the inorganic filler particles 2, and the LTO particles 3 were changed as shown in the following Table 1.

Comparative Example 1

The battery 100 was produced according to the same production method as in Example 1 except that a negative electrode paste including no inorganic filler particles 2 and LTO particles 3 was prepared, and a solid content composition of the negative electrode paste was "graphite particles:CMC:SBR=98:1:1 (mass ratio)."

Comparative Examples 2 to 5

The batteries 100 were produced according to the same production method as in Example 1 except that a negative electrode paste including no LTO particles 3 was prepared, a solid content composition of the negative electrode paste was "graphite particles:inorganic filler particles:CMC:SBR=93:5:1:1 (mass ratio)" and the inorganic filler particles 2 having an average primary particle size shown in the following Table 1 was used.

Comparative Example 6

The battery 100 was produced according to the same production method as in Example 1 except that, as shown in the following Table 1, the inorganic filler particles 2 having an average primary particle size of 3 μm and the inorganic filler particles 2 having an average primary particle size of 1 μm were prepared, a negative electrode paste including no LTO particles 3 was prepared, and a solid content composition of the negative electrode paste was "graphite particles:inorganic filler particles (average primary particle size=3 μm):inorganic filler particles (average primary particle size=1 μm):CMC:SBR=88:5:5:1:1 (mass ratio)."

Comparative Example 7

The battery 100 was produced according to the same production method as in Example 1 except that a negative electrode paste including no inorganic filler particles 2 was prepared, and a solid content composition of the negative electrode paste was "graphite particles:LTO particles:CMC:SBR=93:5:1:1 (mass ratio)."

Comparative Example 8

The battery 100 was produced according to the same production method as in Comparative Example 7 except that the average primary particle size of the LTO particles 3 was changed as shown in the following Table 1.

Comparative Example 9

The battery 100 was produced according to the same production method as in Example 4 except that the average primary particle size of the inorganic filler particles 2 was changed as shown in the following Table 1.

Comparative Example 10

The battery 100 was produced according to the same production method as in Comparative Example 7 except that the average primary particle size of the LTO particles 3 was changed as shown in the following Table 1.

Comparative Examples 11 to 13

The batteries 100 were produced according to the same production method as in Examples 1 to 6 except that the average primary particle size of the LTO particles 3 was changed as shown in the following Table 1.

Comparative Example 14

The battery 100 was produced according to the same production method as in Comparative Example 7 except that the average primary particle size of the LTO particles 3 was changed as shown in the following Table 1.

Comparative Examples 15 to 17

The batteries 100 were produced according to the same production method as in Examples 1 to 6 except that the average primary particle size of the LTO particles 3 was changed as shown in the following Table 1.

<Evaluation>

The negative electrode 20 and the battery 100 were evaluated as will be described below.

<Measurement of Spring Constant>

The spring constant of the negative electrode 20 was measured according to the method described above. The results are shown in the following Table 1. The results show that the higher the spring constant, the harder the negative electrode 20.

<Evaluation of High Rate Tolerance>

An (initial) charging rate (state of charge, SOC) of the battery 100 was adjusted to 60%. The battery 100 was disposed in a thermostatic chamber set to 25° C. The battery 100 was discharged at a current rate of 20C for 10 seconds. A voltage drop amount during discharge was measured. An initial IV resistance was calculated by dividing the voltage drop amount by a current. Here "1C" refers to a current rate at which the battery 100 can be charged to a rated capacity in 1 hour.

The battery 100 was disposed in a thermostatic chamber set to 25° C. The following procedures of "pulse charge→pause→pulse discharge→pause" were defined as one cycle, and 2000 cycles were performed: pulse charge: 30C×10 seconds, pause: 10 seconds, pulse discharge: 10C× 300 seconds, and pause: 10 seconds.

After 2000 cycles, in the same manner as above, an IV resistance after the cycles was measured. A resistance increase rate was calculated by dividing the IV resistance after the cycles by the initial IV resistance. The results are shown in a column of "initial high rate tolerance (resistance increase rate)" in the following Table 1. Values shown in the column are values obtained by dividing the resistance increase rate of each example by the resistance increase rate of Comparative Example 1. The larger the value shown in the column, the more excellent the initial high rate tolerance.

(After High Temperature Storage)

The SOC of the battery 100 was adjusted to 80%. The battery 100 was stored in a thermostatic chamber set to 60° C. for 60 days.

After 60 days of storage, the SOC of the battery 100 was adjusted to 60%. The battery 100 was disposed in a thermostatic chamber set to −10° C. The following procedures of "pulse charge→pause→pulse discharge→pause" were defined as one cycle, and 1000 cycles were performed: pulse charge: 25C×20 seconds, pause: 10 seconds, pulse discharge: 25C×20 seconds, and pause: 10 seconds.

A capacity retention rate was calculated by dividing the capacity after 1000 cycles by the initial capacity. The results are shown in a column of "high rate tolerance after high temperature storage (capacity retention rate)" in the following Table 1. Values shown in the column are values obtained by dividing the capacity retention rate of each example by the capacity retention rate of Comparative Example 1. The larger the value shown in the column, the better the high rate tolerance after high temperature storage.

TABLE 1

| | Negative electrode | | | | | | Battery performance | |
| | Graphite particles | Inorganic filler particles | | LTO particles | | | | High rate tolerance after high temperature storage (capacity retention rate) |
| | Average primary particle size μm | Type | Average primary particle size (A) μm | Average primary particle size (B) μm | Particle size ratio B/A — | Water-based binder Type | Hardness Spring constant kN/mm | Initial high rate tolerance (resistance increase rate) — |
|---|---|---|---|---|---|---|---|---|---|
| Comparative Example 1 | 10 | — | — | — | — | CMC, SBR | 220 | 100 | 100 |
| Comparative Example 2 | 10 | Boehmite | 1 | — | — | CMC, SBR | 250 | 179 | 89 |
| Comparative Example 3 | 10 | Boehmite | 3 | — | — | CMC, SBR | 241 | 157 | 89 |
| Comparative Example 4 | 10 | Boehmite | 5 | — | — | CMC, SBR | 231 | 145 | 87 |
| Comparative Example 5 | 10 | Boehmite | 7 | — | — | CMC, SBR | 214 | 122 | 88 |
| Comparative Example 6 | 10 | Boehmite | 3 μm + 1 μm (two types) | — | — | CMC, SBR | 240 | 145 | 88 |
| Comparative Example 7 | 10 | — | — | 0.7 | — | CMC, SBR | 249 | 165 | 112 |
| Example 1 | 10 | Boehmite | 1 | 0.7 | 0.70 | CMC, SBR | 281 | 201 | 111 |
| Example 2 | 10 | Boehmite | 3 | 0.7 | 0.23 | CMC, SBR | 265 | 198 | 113 |
| Example 3 | 10 | Boehmite | 5 | 0.7 | 0.14 | CMC, SBR | 253 | 185 | 115 |
| Comparative Example 8 | 10 | — | — | 1 | — | CMC, SBR | 245 | 155 | 113 |
| Example 4 | 10 | Boehmite | 1 | 1 | 1 | CMC, SBR | 262 | 198 | 109 |
| Example 5 | 10 | Boehmite | 3 | 1 | 0.33 | CMC, SBR | 253 | 186 | 111 |
| Example 6 | 10 | Boehmite | 5 | 1 | 0.20 | CMC, SBR | 251 | 165 | 115 |
| Comparative Example 9 | 10 | Boehmite | 7 | 1 | 0.14 | CMC, SBR | 243 | 158 | 112 |
| Comparative Example 10 | 10 | — | — | 3 | — | CMC, SBR | 238 | 143 | 113 |
| Comparative Example 11 | 10 | Boehmite | 1 | 3 | 3 | CMC, SBR | 239 | 142 | 113 |
| Comparative Example 12 | 10 | Boehmite | 3 | 3 | 1 | CMC, SBR | 244 | 157 | 113 |
| Comparative Example 13 | 10 | Boehmite | 5 | 3 | 0.6 | CMC, SBR | 244 | 156 | 116 |
| Comparative Example 14 | 10 | — | — | 5 | — | CMC, SBR | 230 | 132 | 112 |
| Comparative Example 15 | 10 | Boehmite | 1 | 5 | 5 | CMC, SBR | 238 | 137 | 111 |
| Comparative Example 16 | 10 | Boehmite | 3 | 5 | 1.67 | CMC, SBR | 238 | 140 | 109 |
| Comparative Example 17 | 10 | Boehmite | 5 | 5 | 1 | CMC, SBR | 241 | 148 | 109 |

Table 1 List of all examples and comparative examples
  <Results>

As shown in Table 1, in the examples that had satisfied the following conditions (1) to (4), the hardness of the negative electrode 20 was improved compared to comparative examples in which one or more of the conditions (1) to (4) were not satisfied. It is thought that voids between the graphite particles 1 were efficiently filled with the inorganic filler particles 2 and the LTO particles 3. (1) the negative electrode mixture layer 22 includes the graphite particles 1, the inorganic filler particles 2, the LTO particles 3, and a water-based binder. (2) the inorganic filler particles 2 have an average primary particle size that is ½ or less of the average primary particle size of the graphite particles 1. (3) the LTO particles 3 have an average primary particle size of 1 μm or less. (4) the particle size ratio (the ratio of the average primary particle size of the LTO particles 3 with respect to the average primary particle size of the inorganic filler particles 2) is one or less.

As shown in Table 1, when the negative electrode mixture layer 22 included the LTO particles 3, the high rate tolerance after high temperature storage was improved. It is thought that a potential rise at the end of winding of the negative electrode 20 during high temperature storage was prevented due to the LTO particles 3.

In Example 5, the hardness of the negative electrode 20 was improved compared to Comparative Example 6. Based on this result, it is thought that the LTO particles 3 entered small gaps prior to boehmite particles. The hydrophilicity of the LTO particles 3 is thought to be high.

As shown in Table 1, a trend in which, when the particle size ratio is 0.20 or more, the hardness of the negative electrode 20 is further improved, and when the particle size ratio is 0.23 or more, the hardness of the negative electrode 20 is even further improved, is observed. A trend in which, when the hardness of the negative electrode 20 is improved, the initial high rate tolerance is improved is observed.

The embodiments and the examples are only examples and should not be considered as restrictive. The scope of the present disclosure is defined by the appended claims, and is intended to encompass equivalents of the scope of the appended claims and all modifications falling within the scope of the appended claims.

What is claimed is:

1. A method of producing a lithium ion secondary battery, the method consisting of:
    mixing graphite particles, inorganic filler particles, lithium titanate particles, a water-based binder, and an aqueous solvent to prepare a negative electrode paste;
    applying the negative electrode paste to a surface of a negative electrode current collector and performing drying of the negative electrode paste applied to the surface of the negative electrode current collector to form a negative electrode mixture layer;
    compressing the negative electrode current collector and the negative electrode mixture layer to produce a negative electrode; and
    producing a lithium ion secondary battery including a positive electrode, the negative electrode, and an electrolyte solution,
    wherein the inorganic filler particles have an average primary particle size that is ½ or less of an average primary particle size of the graphite particles,
    wherein the lithium titanate particles have an average primary particle size of 1 μm or less, and
    wherein a ratio of the average primary particle size of the lithium titanate particles with respect to the average primary particle size of the inorganic filler particles is one or less.

2. The method according to claim 1, wherein the ratio of the average primary particle size of the lithium titanate particles with respect to the average primary particle size of the inorganic filler particles is 0.20 or more.

3. The method according to claim 1, wherein the ratio of the average primary particle size of the lithium titanate particles with respect to the average primary particle size of the inorganic filler particles is 0.23 or more.

4. The method according to claim 1, wherein the inorganic filler particles have the average primary particle size that is 1/10 or more of the average primary particle size of the graphite particles.

5. The method according to claim 1, wherein the lithium titanate particles have
    the average primary particle size of 0.7 μm or more.

6. The method according to claim 1, wherein the inorganic filler particles are at least one selected from the group consisting of boehmite particles, alumina particles, and aluminum hydroxide particles.

* * * * *